L. COATALEN AND H. C. M. STEVENS.
THRUST BEARING.
APPLICATION FILED JULY 16, 1919.
1,328,716.
Patented Jan. 20, 1920.
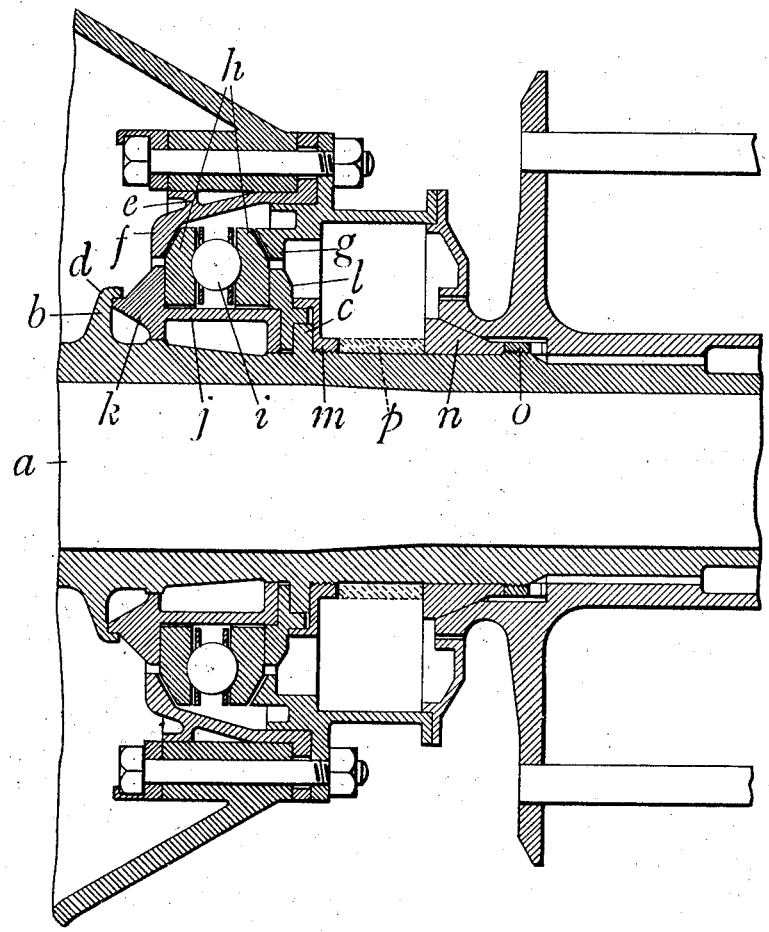
L. Coatalen
H.C.M Stevens,
INVENTORS
BY *H. R. Kerslake*
ATTORNEY

UNITED STATES PATENT OFFICE.

LOUIS COATALEN AND HERBERT CHAS. MACLEOD STEVENS, OF WOLVERHAMPTON, ENGLAND.

THRUST-BEARING.

1,328,716.  Specification of Letters Patent.  Patented Jan. 20, 1920.

Application filed July 16, 1919. Serial No. 311,284.

*To all whom it may concern:*

Be it known that we, LOUIS COATALEN and HERBERT CHARLES MACLEOD STEVENS, residing at Moorfield Works, Wolverhampton, in the county of Stafford, England, subjects of the King of Great Britain and Ireland, have invented certain new and useful Improvements Relating to Thrust-Bearings, of which the following is a specification.

This invention relates to thrust bearings and has for its object to construct an improved bearing capable of supporting thrust pressures in either direction and adapted particularly for the propeller shafts of aviation engines.

The invention comprises the arrangement between a pair of collars on the shaft, and a pair of shoulders on the housings, of a ball bearing thrust ring, and divided rings mounted between the collars on the shaft for holding the bearing ring in position and transmitting to the same the endwise pressures of the shaft.

The accompanying drawing shows in cross section a thrust bearing constructed in accordance with this invention.

In carrying the invention into effect as shown, the shaft $a$ (which may be the propeller shaft of an aviation engine) has formed on it a pair of collars $b$ and $c$. One collar $b$ has an overhanging flange $d$ around its periphery while the other $c$ is plain. On the portion of the housing $e$ adjacent to said collars a pair of shoulders $f$ and $g$ are provided, this portion of the housing being made in two detachably connected parts with a shoulder on each. The housing shoulders are respectively inclined in opposite directions to the axis of the shaft or are made to a spherical form having their centers of curvature on the shaft axis. The ball bearing consists of a pair of rings $h$ with balls $i$ between them, each ring on its outer side being shaped to co-act with the housing shoulders. Over the shaft between the collars on the same is placed a two part or transversely divided ring $j$ having one end shaped to slip under the flange $d$ on the collar $b$. This ring carries the ball bearing, and by means of a flange $k$ at one end abuts against one of the bearing rings. To hold the divided ring in position another similarly divided ring $l$ is placed between it and the plain collar $c$ on the shaft. The second divided ring is arranged to bear against the other bearing ring. To prevent separation of the parts of the second divided ring when in position, a flanged collar $m$ slipped over the shaft is adapted to embrace an annular projection on the ring, this collar may be held in position by being screwed on to the shaft, or by any other convenient manner, *e. g.*, a bearing piece $p$ (indicated by dotted lines) between the collar $m$ and a part $n$ on the shaft may be utilized, the part $n$ being held by a nut $o$.

A bearing as above described is simple in construction, and is capable of taking heavy thrust pressures in either direction.

Having thus described our invention what we claim as new and desire to secure by Letters Patent is:—

1. In thrust bearings, the combination comprising a shaft, a pair of collars on the shaft, a housing, and a pair of shoulders on the housing, a thrust ball ring located between the shoulders on the housing, a pair of divided rings mounted between the shaft collars for holding the ball ring in position and transmitting to it endwise pressures on the shaft, and means for securing the parts of the divided rings, substantially as described.

2. A thrust bearing for the propeller shafts of aviation engines and for like purposes, comprising a shaft, a pair of collars on the shaft, one of which collars has an overhanging flange, a housing, a pair of shoulders on the housing having oppositely inclined faces, a transversely divided ring placed over the shaft, the said ring being adapted to slip under the inner edge of the overhanging flange of one of the shaft collars, a second transversely divided ring located between the first divided ring and the second collar on the shaft, a ball thrust ring mounted on the first divided ring and arranged between flanges on the two divided rings and the shoulders on the housings, and a flanged collar arranged on the shaft and adapted to secure the parts of the second divided ring, substantially as described.

In testimony whereof we have signed our names to this specification.

LOUIS COATALEN.
HERBERT CHAS. MACLEOD STEVENS.